May 27, 1969 HARUO ITO 3,446,987

VARIABLE RESISTANCE CIRCUIT

Filed Nov. 4, 1966

INVENTOR.
HARUO ITO

BY A. C. Smith

ATTORNEY

United States Patent Office 3,446,987

Patented May 27, 1969

3,446,987

VARIABLE RESISTANCE CIRCUIT

Haruo Ito, Loveland, Colo., assignor to Yokogawa-Hewlett-Packard, Ltd., Tokyo, Japan, a corporation of Japan Filed Nov. 4, 1966, Ser. No. 592,029

Claims priority, application Japan, Nov. 15, 1965, 40/70,066

Int. Cl. H03k 17/74

U.S. Cl. 307—200 2 Claims

ABSTRACT OF THE DISCLOSURE

A variable resistance circuit includes a pair of transistors, each having an emitter load resistor, and a pair of diodes serially connected between the emitters of the transistors. Input signal applied to the transistor controls the variable resistance which appears between the common connection of the diodes and a reference terminal but does not appear between these terminals.

This invention relates to a variable resistor circuit using semiconductor diodes and has as its principal object the provision of a circuit in which the dynamic resistance can be controlled by an electric signal.

It is another object of the present invention to provide a variable resistance circuit which decreases signal distortion due to the nonlinear, signal-controlled conductive characteristics of semiconductor diodes.

Other and incidental objects of the present invention will be apparent from a reading of this specification and an inspection of the accompanying drawing in which.

Figure 1:
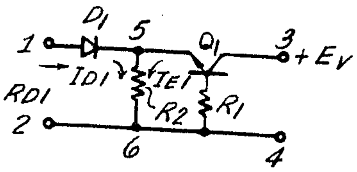
FIGURE 1 is a circuit diagram of one embodiment of the present invention.

FIGURE 1 shows the fundamental circuit of this invention. $D_1$ is a junction type semiconductor diode, $Q_1$ denotes a transistor, $R_1$ and $R_2$ represent resistor elements whose resistance values are represented by symbols $R_1$ and $R_2$ in the diagram respectively. Assuming that $i_{D1}$ is the forward current of semiconductor diode $D_1$, and $i_{E1}$ is the emitter current of transistor $Q_1$, the equivalent resistance $R_{D1}$ presented to small amplitude input signals as seen from terminals 1 and 2 is given as the sum of the dynamic resistance of diode $D_1$ and the parallel resistance of $R_2$ and the equivalent resistance as seen from the emitter side of $Q_1$.

This can be expressed by the following formula:

$$R_{D1}=1/\frac{q}{kT}(i_{D1}+i_{S1})+R_2||(1/\frac{q}{kT}i_{E1}+R_1/h_{fe1}) \tag{1}$$

In Formula 1, $i_{S1}$ represents the backward saturation current (unit ampere) of diode $D_1$, $h_{fe1}$ represents the current amplification factor of transistor $Q_1$, and the second term of the right side represents the parallel resistance of $R_2$ and the equivalent resistance as seen from the emitter side of transistor $Q_1$.

Thus, by setting $i_{E1}$ fairly large as compared with $i_{D1}$, selecting a large $h_{fe1}$ for transistor $Q_1$, and by setting a small value for $$R_1,\ R_2||\left(1/\frac{q}{kT}i_{E1}+R_1/h_{fe1}\right)$$

can be materially disregarded in relation to $$1/\frac{q}{kT}(i_{D1}+i_{S1})$$

Therefore, the following formula will become valid:

$$R_{D1}\cong 1/\frac{q}{kT}(i_{D1}+i_{S1}) \tag{2}$$

Regarding the probable resistance value for $R_{D1}$ from Equation 2, if $T=290°$ K., $q/kT=40$ v.$^{-1}$, and $$R_{D1}=1/40(i_{D1}+i_{S1})$$

then so long as $i_{D1}\gg i_{S1}$ is valid, $R_{D1}\cong 1/40\ i_{D1}$ and therefore $R_{D1}\cong 250\Omega$ at $i_{D1}=10^{-4}$ A. (100$\mu$ A.), and $R_{D1}\cong 25\Omega$ at $i_{D1}=10^{-3}$ A. (1 ma.). On the other hand, if a backward voltage is applied to the diode, and $i_{D1}\rightarrow i_{S1}$ is caused, then $R_{D1}\rightarrow\infty\Omega$.

Figure 2:
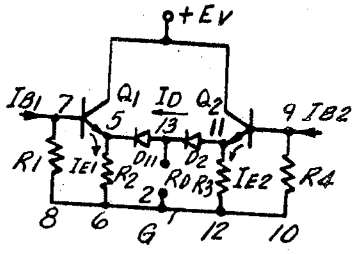
FIGURES 2 and 4 are circuit diagrams of preferred embodiments of the present invention.

The circuit of FIGURE 2 consists of two of the basic circuit shown in FIGURE 1 connected by input terminal 1 and 2, with the driving power source commonly connected. Here, it is assumed that transistors $Q_1$ and $Q_2$ are of equal characteristics, that $R_2$ and $R_3$ are equal, and that diodes $D_1$ and $D_2$ are also of equal characteristics. In the case where control signal currents $I_{B1}$ and $I_{B2}$ whose magnitudes are mutually different are supplied from external sources to terminals 7, 8 and to terminals 9, 10 and current $I_D$ flows at diodes $D_1$ and $D_2$, the equivalent resistance $R_D$ as seen from terminals 1 and 2 can be approximated by $$\frac{q/kT+(I_D+I_S)}{2}$$

Figure 3:
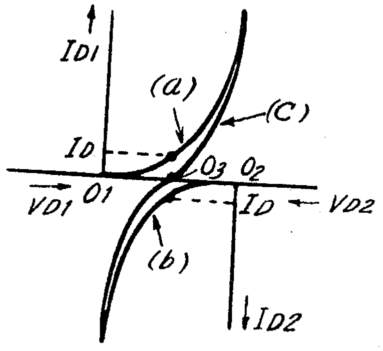
FIGURE 3 is a graph showing the characteristic operation of this invention.

This is illustrated in FIGURE 3 in which the horizontal axis represents voltage and the voltage between points $O_1$ and $O_2$ is the voltage across the serially-connected diodes $D_1$ and $D_2$. Curve (*a*) represents the voltage-current characteristic curve of $D_1$, curbe (*b*) represents the characteristic curve of $D_2$, and curve (*c*) represents the resultant characteristic curve of $D_1$ and $D_2$. The gradient of the tangential line on curve (*c*) at its point of intersection with the horizontal axis gives $$\frac{1/\frac{q}{kT}(I_D+I_S)}{2}$$

The nonlinear distortion is much improved in the circuit of FIGURE 2 compared with that of FIGURE 1. The even number higher harmonic distortion can be completely removed if the characteristics of $D_1$ and $D_2$ are identical.

In the circuit of FIGURE 2, transistors $Q_1$ and $Q_2$ are of identical characteristics, but $Q_1$ and $Q_2$ may be made complementary pair transistors and a control signal may be applied between terminals 7 and 9. In this case, however, should one transistor $Q_1$ be of P-N-P type, for instance, the collector of $Q_1$ must be connected to a power source terminal of negative polarity instead of to a power supply terminal of $+E_v$ volts, as shown.

Figure 4:
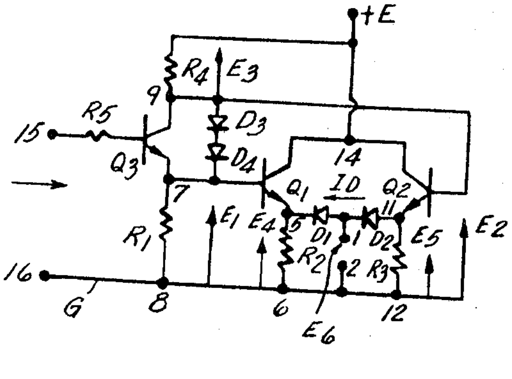

FIGURE 4 shows an actual connection diagram for regulating the equivalent resistance between terminals 1 and 2 by a control signal (DC) applied to terminals 15 and 16. Terminal 15 is connected to the base of transistor $Q_3$ through resistor $R_5$. The collector of transistor $Q_3$ is connected to power source terminal +E through resistor $R_4$, and its emitter is connected to reference potential line G through resistor $R_1$. Also, the two electrodes collector and emitter of $Q_3$ are bridged by semiconductor diodes $D_3$ and $D_4$; emitter electrode 7 is connected to the base electrode of transistor $Q_1$; and collector electrode 9 is connected to the base electrode of transistor $Q_2$. Other connections are identical with those of the circuit of FIGURE 2 and the related descriptions are omitted for brevity.

In FIGURE 4, emitter current $I_{E3}$ of transistor $Q_3$ increases or decreases in accordance with the magnitude of the control signal applied to terminals 15 and 16; but when current amplification factor $h_{fe3}$ of $Q_3$ is sufficiently great, collector current $I_{C3}$ is always approximately equal to $I_{E3}$; and, assuming that $R_1$ equals $R_4$, inter-terminal voltage $E_1=R_1I_{E3}$ across $R_1$ will be always approximately equal to inter-terminal voltage $E_3=R_4I_{C3}$ across $R_4$. Thus, the following equation is valid for the voltage $E_2$ appearing between the base of $Q_2$ and reference potential line G:

$$E_2=E-E_3=E-E_1 \quad (3)$$

Here, E denotes the driving power source voltage to reference potential line G.

Now, if we assume that voltage $E_{BE1}$ between the base and emitter of $Q_1$ is always approximately equal to voltage $_{BE2}$ between the base and emitter of $Q_2$ within the operating range of this circuit ($I_D$ should not be made large so that $I_{E1}$ will not appear negligibly small compared with $I_{E2}$, and so that the difference between $E_{BE1}$ and $E_{BE2}$ will not appear conspicuously large.), then:

$$E_4=E_1-E_{BE1},\ E_5=E_2-E_{BE2}\cong E-E_1-E_{BE2}\cong E-E_1-E_{BE1} \quad (4)$$

When the characteristics of diodes $D_1$ and $D_2$ are equal, voltage $E_6$ at node 1 of $D_1$ and $D_2$ can be given by the means value of $E_4$ and $E_5$. Therefore:

$$E_6=\frac{(E_4+E_5)}{2}=\frac{(E-2E_{BE1})}{2} \quad (5)$$

and it is a constant voltage that has no relation to the control input (viz, this indicates the high degree of isolation between the control signal and the controlled circuitry) which prevents the control signal from appearing between terminals 1 and 2.

The voltage applied to the series circuit of diodes $D_1$ and $D_2$ in the forward direction of these diodes may be expressed as follows:

$$E_5-E_4\cong E_2-E_1=E-2E_1$$

This voltage is approximately equal to the voltage between the collector and emitter of transistor $Q_3$. The minimum possible value for the collector-emitter voltage of $Q_3$ occurs when $Q_3$ is saturated ON, and the maximum value occurs when $Q_3$ is OFF, and the voltage applied to the series circuit of $D_3$ and $D_4$ is produced by the current that flows through $R_4$, $D_3$, $D_4$ and $R_1$ in the direction of the order named. This current in the series circuit of diodes $D_3$ and $D_4$ can be set at an arbitrary value when driving voltage E is constant by changing the values of resistance $R_1$ and $R_4$. Also, assuming that diodes $D_3$ and $D_4$ are identical to $D_1$ and $D_2$, as the current in the series circuit of $D_1$ and $D_2$ is approximately equal to the current in the series circuit of $D_3$ and $D_4$, the maximum value of current $I_D$ that flows in diodes $D_1$ and $D_2$, consequently the minimum possible value of $R_D$, can be set arbitrarily by selecting the values of $R_1$ and $R_2$.

In the variable resistance circuit of this invention, nonlinear distortion is negligibly small on low level AC signals, and the equivalent resistance as seen from the input of the circuit can be controlled by the DC control signal. Moreover, the embodiment of the invention illustrated in FIGURE 4 provides high isolation of the control signal from the input circuitry and provides a minimum value of variable resistance $R_D$ at the input terminal which can be arbitrarily controlled so that the present invention can be used very effectively as a variable resistance element in an automatic balancing bridge.

I claim:

1. A variable resistance circuit comprising:

a source of reference potential;

a pair of transistors, each having base, emitter and collector electrodes and being connected in emitter-follower circuits, each including a load resistance conected between an emitter electrode and said source of reference potential;

a series circuit including a pair of diodes serially-connected in unidirectional conduction alignment between the connection of the emitter electrode and the load resistance of each of said emitter-follower circuits;

control input means connected to said pair of transistors for applying a control signal to each of the input bases of the transistors connected in emitter-follower circuits; and a pair of circuit terminals, one circuit terminal being conected to said series circuit intermediate said pair of diodes and the other circuit terimnal being connected to said source of reference potential, whereby the resistance between said pair of circuit terminals is varied in response to signal applied to said control input means.

2. A variable resistance circuit as in claim 1 wherein said control input means includes a control transistor having a load resistance connected to the emitter and another resistance connected to the collector;

means connecting the bases of said pair of transistors to the collector and emitter of said control transistor; and diode means connected between the bases of said pair of transistors.

References Cited

UNITED STATES PATENTS

| | | | |
|---|---|---|---|
| 3,192,405 | 6/1965 | Patchell | 307—317 |
| 3,286,106 | 11/1966 | Deveson | 307—317 XR |

JOHN S. HEYMAN, *Primary Examiner.*

JOHN ZAZWORSKY, *Assistant Examiner.*

U.S. Cl. X.R.

307—229, 317; 330—145